United States Patent [19]

Moore et al.

[11] 3,958,076

[45] May 18, 1976

[54] SPACER DAMPER FOR OVERHEAD POWER TRANSMISSION LINES

[75] Inventors: Edwin Barclay Moore, Leicestershire; Thomas John Smart, Oadby, both of England

[73] Assignee: Dunlop Limited, London, England

[22] Filed: Mar. 3, 1975

[21] Appl. No.: 554,523

[30] Foreign Application Priority Data

Mar. 12, 1974 United Kingdom............ 10912/74

[52] U.S. Cl............................. 174/42; 174/146; 188/1 B; 403/111; 403/117; 403/217; 403/224; 403/225
[51] Int. Cl.².................. H02G 7/14; H02G 7/12
[58] Field of Search................. 174/40 R, 42, 146; 188/1 B; 267/57.1 A, 136, 137, 141; 403/64, 111, 113, 117, 120, 162, 217, 224, 225, 228

[56] References Cited
UNITED STATES PATENTS

| | | |
|---|---|---|
| 2,179,959 | 11/1939 | Schroedter........................... 403/224 |
| 3,443,019 | 5/1969 | Walker et al. ...................... 174/42 |
| 3,465,089 | 9/1969 | Torr...................................... 174/146 X |
| 3,475,544 | 10/1969 | Reed..................................... 174/42 |
| 3,582,983 | 6/1971 | Claren .................................. 174/42 |
| 3,613,104 | 10/1971 | Bradshaw............................. 174/42 |
| 3,762,747 | 10/1973 | Griffen................................. 403/225 |

FOREIGN PATENTS OR APPLICATIONS

| | | |
|---|---|---|
| 915,768 | 11/1972 | Canada................................ 174/146 |
| 1,159,053 | 12/1963 | Germany............................. 174/146 |
| 1,028,258 | 5/1966 | United Kingdom................ 174/146 |
| 1,076,421 | 7/1967 | United Kingdom................ 174/146 |
| 1,098,813 | 1/1968 | United Kingdom................ 174/146 |

*Primary Examiner*—Laramie E. Askin
*Attorney, Agent, or Firm*—Stevens, Davis, Miller & Mosher

[57] ABSTRACT

A spacer-damper for overhead power transmission lines wherein a rigid arm is provided for each sub-conductor mounted on a rigid frame by a damped resilient connection member which provides damped resilient movement in all directions of arm movement.

20 Claims, 7 Drawing Figures

U.S. Patent   May 18, 1976   Sheet 1 of 2   3,958,076
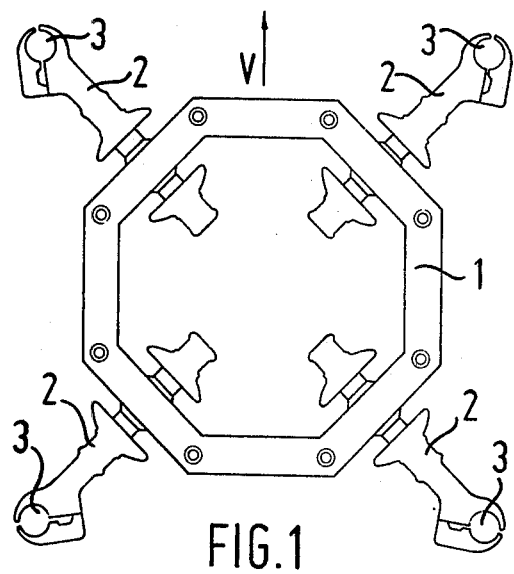
FIG.1
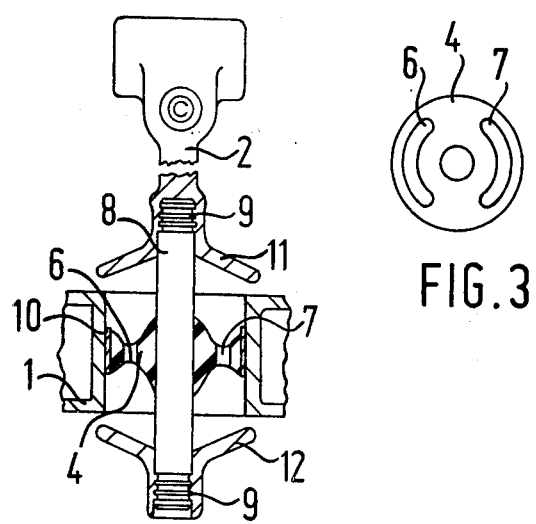
FIG.2
FIG.3

SPACER DAMPER FOR OVERHEAD POWER TRANSMISSION LINES

This invention relates to spacer dampers for overhead power transmission lines comprising two or more sub-conductors arranged in a grouped bundle for each phase or pole.

It is well known to provide spacer devices for maintaining the spaced arrangement of the sub-conductor bundle. Known devices include arms with a conductor clamp at one end and a pivot, having an axis perpendicular to the sub-conductor axes, at the other end to allow relative conductor movement in the longitudinal direction of the conductors. Movement in other directions is resisted to maintain the conductor assembly and thus the space between the sub-conductors.

Spacer-damper devices are also known in which an arm for each sub-conductor is resiliently mounted for limited pivotal movement about an axis parallel to the sub-conductor. The resultant resilient movement damps to some extent vertical and horizontal sub-conductor oscillations but suffers from the disadvantage of inherent transverse stiffness and consequent lack of damping effectiveness in at least one direction. We have found that the total damping of conductor vibration is reduced because of the tendency for the conductors to vibrate in the direction of greatest stiffness.

The applicants have now discovered that the provision of substantial damped resilient movement in all directions in a plane transverse of each sub-conductor with respect to the other sub-conductors enables improved damping to be achieved of sub-conductor movements including both aeolian (i.e. generally vertical), and "sub-conductor" (i.e. generally horizontal) vibrations either singly or in combination.

According to one aspect of the present invention a spacer damper for a sub-conductor bundle of two or more sub-conductors comprises a substantially rigid body member, an arm for attaching each sub-conductor to the body member, each arm provided with clamp means at one end, the clamp means having a groove extending in the direction of the axis of the sub-conductor bundle for attachment to one of the sub-conductors, and a connection between the other end of each arm and the body member wherein the connection comprises a damped resilient member providing damped resilient movement in all directions of arm movement.

The damped resilient member preferably comprises elastomeric material which provides the requisite damping by hysteresis losses within the elastomeric material. The elastomeric material may be bonded to either or both of the body member and the arm or may be mechanically connected thereto.

Preferably the maximum ratio between stiffness in any two directions is 10 to 1. More preferably substantially the same degree of stiffness is provided in each direction of movement. The elastomeric material may be electrically conductive to allow the electrical potentials of each sub-conductor to remain substantially equal.

According to another aspect of the invention the resilient connection may comprise an annular elastomeric material bush disposed co-axially with the center-line of the arm.

The arm is preferably attached to the inner curved surface of the bush by bonding and the body is attached to the outer curved surface of the bush by bonding to a metal sleeve which in turn is securely retained in an aperture provided in the body.

The bush may have provided apertures extending partly or fully through the bush to provide the required stiffness values in various directions.

According to yet another aspect of the invention, the resilient connection may comprise a pair of similar elastomeric material cylinders mounted about a common axis parallel to the sub-conductor axis wherein one end face of each cylinder is connected to the body and the other end faces of the cylinders are connected to parallel spaced-apart surfaces provided at the end of the arm, each surface extending in a plane perpendicular to the axis of the groove in the clamp means such that arm movement in said plane results in shear deformation of the cylinders.

The pair of cylinders are each preferably bonded between end washers which are mechanically connected to the arm and body. The mechanical connection is preferably by means of interengaging teeth provided on the end washers, the arm and the body. The body may be in the form of two halves which are assembled to engage either washer and are maintained assembled by means of bolts extending through the washers and a clearance hole in the arm. The bolts provide, by means of limiting the clearance allowed, a stop to prevent excessive arm movement.

According to yet another aspect of the invention the elastomeric material resilient members may comprise a pair of spaced-apart elastomeric material rings having a common axis and mounted with said axis disposed generally co-axially with the center-line of the arm, each ring being in contact at one side with the arm and at another side with the body.

The spacer damper may comprise any number of arms dependent on the number of sub-conductors and may be used for 2, 3 or multiple sub-conductor bundles.

Some embodiments of the invention will now be described, by way of example only, in conjunction with the attached diagrammatic drawings in which:

FIG. 1 is an end elevation of a quad spacer damper according to the invention;

FIG. 2 is a sectional view of one of the resilient connections of the spacer damper in FIG. 1;

FIG. 3 shows a resilient bush for the spacer damper of FIGS. 1 and 2;

Figure 4:
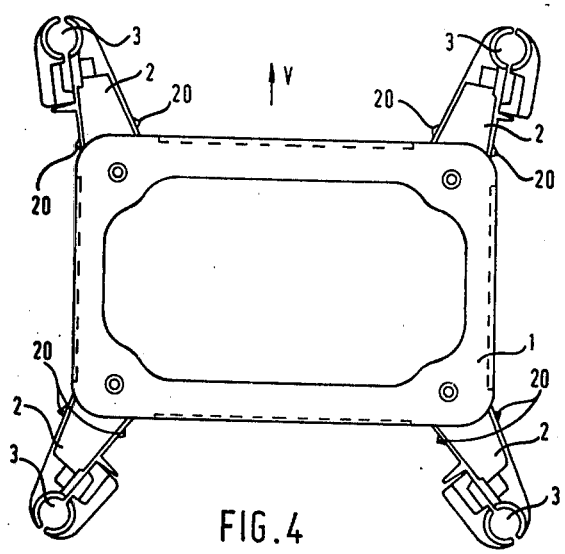
FIG. 4 shows in end elevation an alternative spacer damper according to the invention.

The spacer damper shown in FIG. 1 comprises an octagonal open-frame body 1 and four arms 2 extending from the body each at an angle of 45° to the vertical center-line V. Each arm is provided with a removable clamp device 3 by which the arm can be clamped to a sub-conductor (not shown). The arrangement shown is for a four sub-conductor transmission line in which the sub-conductors are equally spaced in a square configuration.

Each arm 2 is mounted in the body 1 by means of a rubber bush 4 which includes a pair of arcuate slots 6, 7 as shown in FIG. 3. The inner surface of the bush 4 is bonded to a metal pin 8 which is attached to the outer portion of the arm 2 by swaging the arm material into co-axial pin-grooves 9 as shown in FIG. 2.

The outer surface of the bush 4 is bonded into a cylindrical metal sleeve 10 and this sleeve 10 is press-fitted into the body 1 of the spacer damper. The upper portion of the arm 2 is provided with a projecting disc 11 which acts as a stop, to prevent excessive movement of the arm, by abutting the body. A similar stop 12 is provided at the other end of the pin 8 and this stop 12 also abuts the body 1 to prevent excessive arm movement.

In use the arm is able to move by resilient deformation of the rubber bush 4. Movement in the direction of the axis of the arm causes shear deformation of the rubber and other directions of movement cause shear, compression and/or tensile deformation of the rubber. The stiffnesses in the various directions are generally made substantially the same and the maximum ratio between stiffnesses in any two directions is 10:1. Such variations are useful if one particular form of vibration (e.g. aeolian) is troublesome in a particular installation. The stiffnesses required may be obtained by changing the slot dimensions, adding further slots, deleting slots or modifying the bush shape in other ways. The arms as shown are at 45° to the vertical center-line but this arm angle may be varied as is convenient with a particular spacer damper; and as the connection provides universal resilience, the arms may be at any angle to the vertical center-line V or may be parallel to the said center-line.

The alternative embodiment of FIG. 4 is again a quad spacer and comprises a rectangular central body 1 and four arms 2 angularly disposed at 25° to the vertical center-line V (i.e. 65° to the horizontal). The spacer body comprises two halves 1A and 1B as shown in FIG. 5 which are bolted together to form the assembled body 1. At the end of the arm 2, which is to be resiliently connected to the body, are provided two parallel faces 13 which are machined in a plane normal to the direction of the sub-conductor on each side of the clamp 3. Similar opposed faces 14 are machined in the body halves 1A and 1B; and in the spaces between the faces 13 and 14 are fitted a pair of resilient rubber assemblies 15. Each rubber assembly 15 comprises an inner metal disc or washer 17, a central rubber element 16 and an outer metal disc or washer 18, the rubber element 16 being bonded to each of the elements 17 and 18 to form the complete rubber assembly 15.

The metal discs or washers 17 and 18 have teeth formed in their outer edges as shown in FIG. 6 and complementary tooth formations (not shown) are formed on the periphery of the faces 13 of the arms 2 and on the faces 14 of the two halves 1A and 1B of the body.

Figures 5, 6, 7:
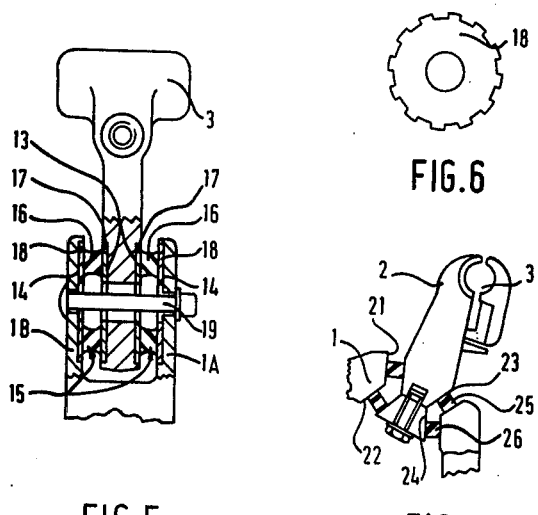
FIGS. 5 and 6 show respectively details of the resilient connection and end washers for the resilient connections of the spacer damper in FIG. 4.
FIG. 7 shows an alternative resilient connection.

On assembly, the teeth on the washers are engaged with those on the body 1 and on the arms 2 and the two halves of the body are then attached together by bolts 19 such that the rubber assemblies 15 are held between them as shown in FIG. 4 in a condition of precompression.

In operation, movement in the direction of length of the arms 2 results in shear deformation of the two rubber assemblies 15 and movement in other directions results in shear, compressive and/or tensile deformations of the resilient members. Limit stops 20 are pvodided on each arm which engage the body and this prevents excessive torsional arm movement.

An alternative resilient connection to the arrangement of FIGS. 1, 2 and 3 is shown in FIG. 7. In this arrangement a pair of conical abutment surfaces 21, 22 are provided on the frame. A second pair of complementary conical abutment faces 23, 24 are formed on the arm to form a pair of conical annular apertures, and two rubber rings 25, 26 are clamped into the conical apertures thus formed between the opposing surfaces. O-rings, square or rectangular section rings may be used.

Each of the spacers described above provides for resilient movement of each arm in any direction and this allows sub-conductor movement due to longitudinal conductor movement, aeolian vibrations, "sub-conductor" vibrations and indeed any other oscillations causing arm movement. The movement is damped by the inherent hysteresis damping of the elastomeric material which is used for the resilient members. The choice of elastomeric material and the volume of the elastomeric material is made dependent on the degree of damping (i.e. the stiffness) required bearing in mind the available energy dissipation per unit volume of the elastomer, the temperature range, the amplitude, and the frequency range in which the spacer damper is to operate.

Provision of universal direction damping as described has particular advantage in that bundle shape and consequent arm direction does not significantly affect the damping available. Thus, for example, an eight sub-conductor bundle may be damped by a spacer damper constructed according to this invention. In this case the arm angle varies dependent on the particular sub-conductor in which each arm is connected.

Having now described our invention- what we claim is:

1. A spacer-damper for a sub-conductor bundle of two or more sub-conductors comprising a substantially rigid body member, an arm for attaching each sub-conductor to the body member, each arm provided with clamp means at one end, the clamp means having a groove extending in the direction of the axis of the sub-conductor bundle for attachment to one of the sub-conductors, and a connection between the other end of each arm and the body member wherein the connection comprises a damped resilient member providing damped resilient movement in all directions of arm movement, and wherein the maximum ratio between stiffnesses of the resilient member in any two directions is ten to one.

2. A spacer-damper according to claim 1 wherein mechanical stop means is provided for each arm whereby excessive arm movement is prevented.

3. A spacer-damper according to claim 1 wherein the stiffnesses of the resilient member in all directions of arm movement are substantially the same.

4. A spacer-damper according to claim 1 wherein the resilient member comprises elastomeric material which provides damping by internal hysteresis losses.

5. A spacer-damper according to claim 4 wherein the elastomeric material is electrically conductive to allow the electrical potentials of each sub-conductor to be substantially equal.

6. A spacer-damper according to claim 4 wherein an aperture is provided in the elastomeric material resilient member to modify the stiffness of said resilient member.

7. A spacer-damper according to claim 4 wherein the elastomeric material resilient member is mounted in a state of precompression.

8. A spacer-damper according to claim 4 wherein the elastomeric material resilient member comprises an annular bush disposed generally co-axially with the center-line of the arm.

9. A spacer-damper according to claim 8 wherein the annular bush is bonded to the arm.

10. A spacer-damper according to claim 8 wherein the annular bush is attached to the body by means of a metal tube to which the bush is bonded and which is secured in a cylindrical aperture provided in the body.

11. A spacer-damper according to claim 10 wherein the tube is an interference fit in the cylindrical aperture.

12. A spacer-damper according to claim 4 wherein the elastomeric material resilient member comprises a pair of similar elastomeric material cylinders each having two end faces and both cylinders are mounted about a common axis parallel to the axis of the groove in the clamp means wherein one end face of each cylinder is connected to the body and the other end faces of the cylinders are connected to parallel spaced-apart surfaces provided adjacent to the end of the arm, each surface extending in a plane perpendicular to the axis of the groove in the clamp means such that arm movement in said plane results in shear deformation of the cylinders.

13. A spacer-damper according to claim 12 wherein the cylinders are mechanically attached to the arm and body.

14. A spacer-damper according to claim 13 wherein the mechanical attachment comprises a rigid end washer bonded to each end face of each cylinder, each washer having projecting teeth, and complementary projecting teeth being formed in both the body and the arm whereby the sets of projecting teeth interengage to connect one end face of each cylinder to the body and the other end face of each cylinder to the arm.

15. A spacer-damper according to claim 4 wherein the elastomeric material resilient member comprises a pair of spaced-apart elastomeric material rings having a common axis and mounted with said axis disposed generally co-axially with the centre-line of the arm, each ring being in contact at one side with the arm and at another side with the body.

16. A spacer-damper according to claim 15 wherein the rings are each clamped in a conical annular aperture between an abutment surface provided on the arm and a corresponding abutment surface provided on the body and the two conical apertures diverge in opposite axial directions.

17. A spacer-damper according to claim 15 wherein the rings are of square section material.

18. A spacer-damper according to claim 15 wherein the rings are of circular section material.

19. A spacer-damper according to claim 1 wherein the body is in halves about a plane perpendicular to the axis of the groove in the clamp means and the halves are connected together to engage the resilient members and attach them to the body.

20. A spacer-damper according to claim 1 wherein the arms are arranged at an angle of 45° to a vertical plane which includes the axis of the groove in the clamp means.

* * * * *